United States Patent [19]

Jorgensen

[11] Patent Number: 4,907,136
[45] Date of Patent: Mar. 6, 1990

[54] ECHO LOCATION SYSTEM FOR VISION-IMPAIRED PERSONS

[76] Inventor: Adam A. Jorgensen, 1911 NW. 36th St., Oakland Park, Fla. 33309

[21] Appl. No.: 319,305

[22] Filed: Mar. 3, 1989

[51] Int. Cl.$^4$ .............................................. G01S 9/68
[52] U.S. Cl. ................................... 362/116; 342/24; 367/99
[58] Field of Search ................................ 381/29–34; 342/24; 367/99–104, 116, 910

[56] References Cited

U.S. PATENT DOCUMENTS

| | | | |
|---|---|---|---|
| Re. 32,252 | 9/1986 | Kay | 367/102 |
| 2,500,638 | 3/1950 | Krauth . | |
| 2,580,560 | 1/1952 | Larsen | 342/24 |
| 3,366,922 | 1/1968 | Kay . | |
| 3,887,896 | 6/1975 | Ramstedt | 367/116 X |
| 4,041,441 | 8/1977 | Johnson | 367/910 X |
| 4,173,007 | 10/1979 | McKeighen | 367/116 X |
| 4,292,678 | 9/1981 | Kay | 367/102 |
| 4,322,829 | 3/1982 | Weber | 367/99 |
| 4,712,003 | 12/1987 | Ban et al. | 250/221 |
| 4,761,770 | 8/1988 | Wonky | 367/116 |

Primary Examiner—Thomas H. Tarcza
Assistant Examiner—Tod Swann
Attorney, Agent, or Firm—Oltman and Flynn

[57] ABSTRACT

Echo locating apparatus for a vision-impaired person which includes: a sound emitter for emitting a stream of sound bursts of ultrahigh frequency; at least on receive channel having a microphone for receiving echoes of the sound bursts and generating echo signals; an echo profile detector for generating an echo profile signal of each echo signal; a delay circuit for adding a delay to the echo profile signal, consisting of the sum of a fixed delay and a variable delay that increases with the distance to the object reflecting the echo. The sound burst emitter is preferably arranged to emit a beam of sound bursts having a given beam angle that can be pointed in any direction.

17 Claims, 4 Drawing Sheets

ECHO LOCATION SYSTEM FOR VISION-IMPAIRED PERSONS

BACKGROUND AND PRIOR ART

The invention relates to devices to aid blind or vision-impaired persons to orient themselves in relation to surrounding objects.

The invention is based on the knowledge that most people possess an innate ability to orient themselves in relation to their surroundings by means of their binaural sense of hearing. This sense enables a person to perceive echoes coming in various directions from walls and obstacles. This ability, however, is only marginally useful to people mainly due to two problems, namely that the initial sound bursts that create the echoes momentarily "numb" the sensitivity of the ear so that the echo which is much more faint is not heard distinctly, and secondly that each echo, when reflected from nearby objects arrives so short a time after the initial sound that the time difference is imperceptible. Several inventors have disclosed acoustic devices for aiding blind or vision-impaired persons by acoustic means. For example, U.S. Pat. No. 2,500,638 discloses a system of supersonic pulse transmission, wherein the reflected echoes are modulated to a pitch that depends on the distance to reflecting obstacles. U.S. Pat. No. 4,761,770 discloses a supersonic echo locating system wherein reflected pulses are stretched in time by a certain factor, e.g. 32, thereby increasing the delay of received echoes to improve and enhance the perception of the echoes and thereby the distance to reflecting objects. In order to make the stretched echoes better perceptible, they are modulated by a white noise signal. The echo locating systems of the prior art, however suffer from the drawback that simply stretching the time axis for reflected echoes by a given factor does not simultaneously provide good perception of echoes from nearby objects and more distant ones because objects only few feet away must be stretched significantly in order to be perceived as being separate from the originating sound, while echoes from more distant objects become unreasonably stretched and thereby loose the character of an echo. In addition the stretched echoes must be modulated to be audible, which causes a blurring in the perception of overlapping echoes.

It is accordingly an object of the instant invention to overcome the drawbacks of the known art and thereby provide an acoustic echo locating system for vision-impaired persons, which provides simultaneously improved distance perception of nearby as well as more distant objects and at the same time enables a blind person to form in his or her mind a mental "sound image" of the surroundings.

SUMMARY OF THE INVENTION

In accordance with the instant invention there is provided an echo locating system for a blind person, which includes means for emitting sound bursts of a suitable, preferably inaudible ultrasonic frequency toward objects, echo receive means which include at least one receive channel that has a microphone for receiving the echo and generating an echo signal for each sound burst received with a certain actual round trip delay caused by the propagation delay of sound waves in air, and means for adding a further delay as described in more detail below. The echo signal is typically a composite of many echoes reflected from objects located at various distances from the microphone and echoes that have been bounced several times from different objects. The composite echo has an echo profile that is recovered as an echo profile signal by an echo profile detector, which removes the sound burst frequency, and makes the echo signal audible. The echo profile signal is connected to a variable delay circuit for adding he further delay to the echo profile signal. The further delay is a sum of a fixed delay and a variable increasing delay, which increases at a given rate with the distance to the reflecting object(s). The fixed delay is made long enough to give a distinctly perceptible echo from nearby objects.

In one mode of the invention the variable delay may be increasing at a fixed rate of for example three times the round trip delay. At such a relatively low rate of increase, the echo profile is stretched only by a factor of three and therefore remains audible and retains its character as an audible echo which does not need to be modulated to remain audible. In this mode the perception of distances is very distinct for objects at both short ranges such as a few feet and remains distinct at ranges up to about 15 to 20 feet, which is somewhat similar to a seeing person's visual distance perception.

In a still better mode of the invention the variable delay is arranged such that it is increasing at a decreasing rate of increase. In this mode still better range perception is attained at both short ranges and ranges beyond the 15 to 20 feet range.

The echo profile signal received and heard by the blind person accordingly is heard with a total delay consisting of the actual round trip delay, the fixed delay and the variable delay. The fixed delay is selected such that the blind person hears echoes from nearby objects as distinct echoes, and the additional variable delay is selected such that the echoes from more distant objects are heard with a delay increasing with the distance.

In the instant invention it is not necessary nor desirable to add modulation to the echo profile signal since the echo signal is stretched only to a small degree, compared to the stretching required with the prior art. Modulation as shown and required in the prior art only causes a blurring of the individual components of overlapping echo signals and prevents the person from perceiving the individual echoes and their components as range information, and thereby prevents the blind person from forming a mental sound image of the surroundings.

As a further feature, the invention is arranged as a two-channel system with a receive channel for each ear of the user. In this case the user will enjoy the benefit of binaural hearing which further aids in enhancing the distance perception and forming a mental sound image.

As a still further feature, means are provided for feeding back an audible feedback pulse that is synchronous with each emitted sound burst, which enables the blind person to hear the initial sound burst, suitably attenuated, followed by the delayed echoes to further enhance the perception of the received echoes as distance information.

In accordance with still another feature of the invention, the sound emitter is a hand-held device which projects a beam of sound bursts, wherein the beam angle may be adjustable by the user.

These and other features of the invention are described in the following specification when taken together with the figures of the drawing. It is to be understood, however that the invention is not limited to the features described since the invention is capable of further features that will be obvious to a person skilled in the art to which it pertains and are within the scope of equivalencies of the claims.

DETAILED DESCRIPTION OF THE PREFERRED EMBODIMENTS

Figure 1A:
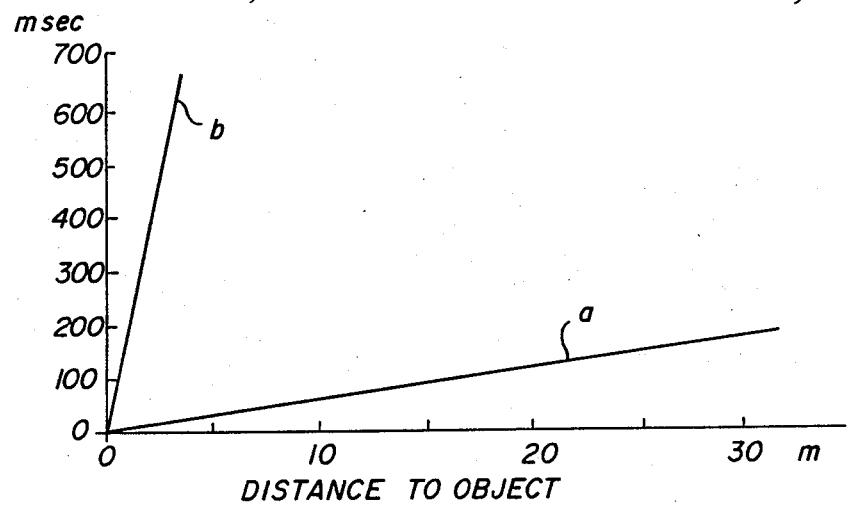
FIG. 1a shows graphs of the round trip delay of a sound burst and of the delay added according to the known art.

FIG. 1a shows in curve "a" the actual round trip delay of an echo in milliseconds, as a function of the distance in meters, to a reflecting object. The velocity of sound in air is close to 340 meters/second. Curve "a" accordingly shows the round trip delay to an object 30 meters away as being approximately 176 msec, and the delay to an object 3 meters away as being 17.6 msec. Tests have shown that a delay of approximately 50 msec is required to perceive an echo as being distinct from the originating sound burst creating it. Curve "b" shows the round trip delay extended artificially as shown in the prior art, by a constant factor, e.g. a factor of 32 times as suggested in the prior art. Using a constant factor for the delay increase has the drawback that in order to perceive echoes from objects as close as for example 0.5 meter a large factor of 32 times is required. This large increase in the delay causes objects being only as far away as 5 meters to be as large as 928 msec. An echo of this magnitude loses its character of being an echo, especially when it is received in a mixture of ambient room noises, and as a result the blind person loses the mental perception of distances to objects even as close as 5 meters, due to the delay having a constant rate of increase such as 32 times, in other words having a fixed rate of delay without the additional fixed delay.

Another drawback to the use of only a fixed and therefore a large rate of delay is that the echo profile also becomes extended, i.e. "smeared", and therefore becomes virtually inaudible so that it must be modulated by some sound or noise in order to become audible. Modulation changes the audible perception of the echo and as a result the innate ability to form a "sound picture" is lost.

Figure 1B:
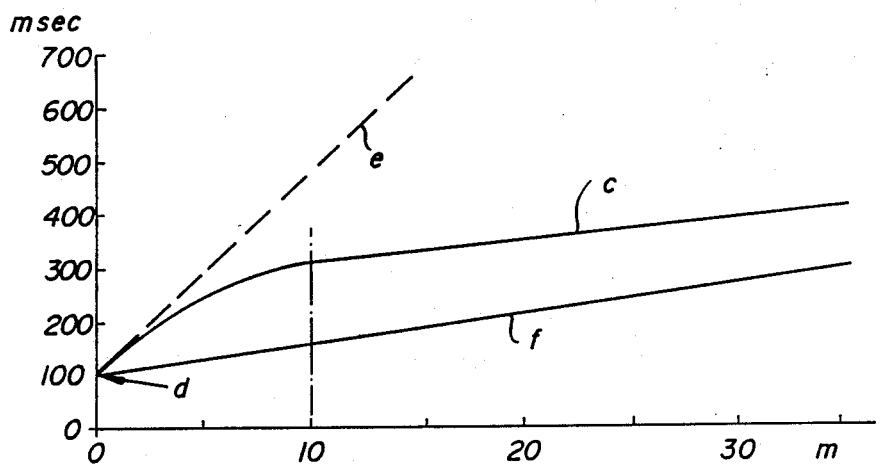
FIG. 1b shows graphs of the added delay according to the instant invention.

FIG. 1b, curve f, shows an echo with a constant fixed delay d added to a variable delay consisting of the actual round trip delay and a fixed rate delay. Curve c shows a fixed delay added to a variable rate delay. The variable delay has a rate of delay increase, which naturally is equal to the slope of the curve c. The curve c has at shorter ranges a greater initial slope as indicated by the dashed line e, and the slope, i.e. the rate of increase decreases as the distance increases, until it becomes virtually linear at greater distances. In this way the profile of the received and artificially delayed echo signal is not significantly extended, i.e. "smeared", and therefore remains audible just like a natural echo and no modulation of the echo signal is required and as a result the received echoes infer to the receiving person a more realistic sense of range, especially with binaural reception.

Figure 2:
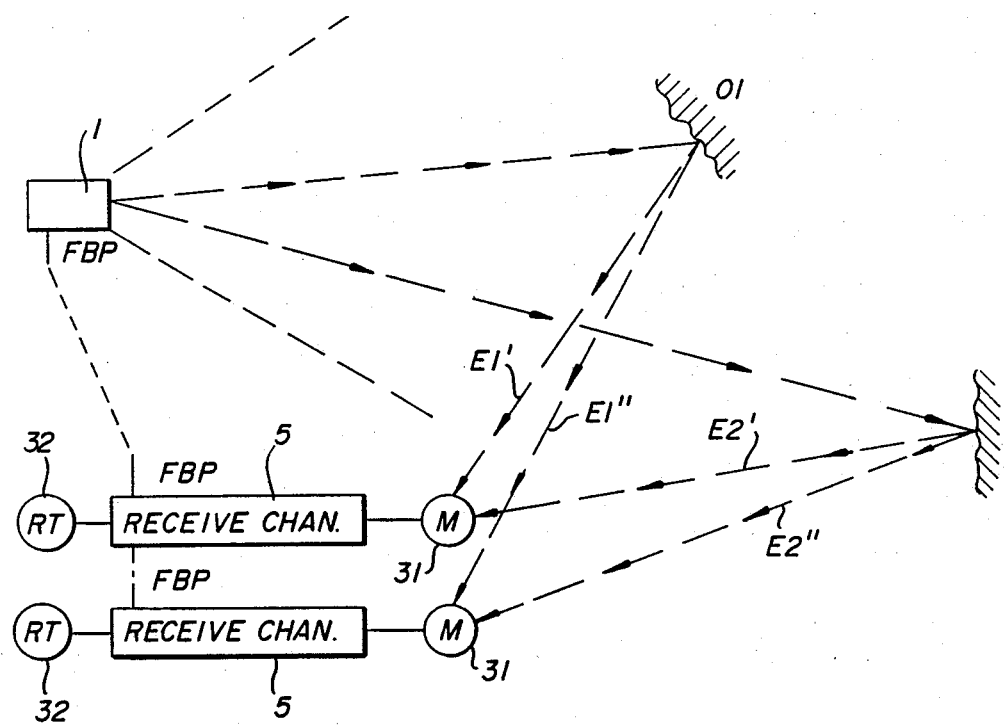
FIG. 2 is an overall block diagram of the instant invention, showing echoes reflected from objects at different distances and directions.

In FIG. 2 a sound emitter 1 radiates sound bursts as indicated by dashed lines into a certain field "of view", which may be a wide angle or narrow angle field of view. Two objects O1 and O2 at different ranges and angles from the sound emitter return respective echoes E1 and E2 to one or two receive channels 5, each having a microphone 31 and a receive transducer 32. The microphones are spaced apart a certain distance and therefore receive echoes E1', E1'', E2', and E2'' from the two objects which are slightly different mainly due to phase differences and therefore labeled with different suffixes and primes. The differences in the echoes enable a person with binaural hearing to subliminally sense distances and directions to reflecting objects, when the echoes have been delayed in accordance with the instant invention.

For each sound burst emitted by the sound emitter 1, a feedback pulse FBP is returned from the sound emitter to each receive channel 5. The feedback may be electrical or may be simply acoustically transmitted to each channel.

Figure 3:
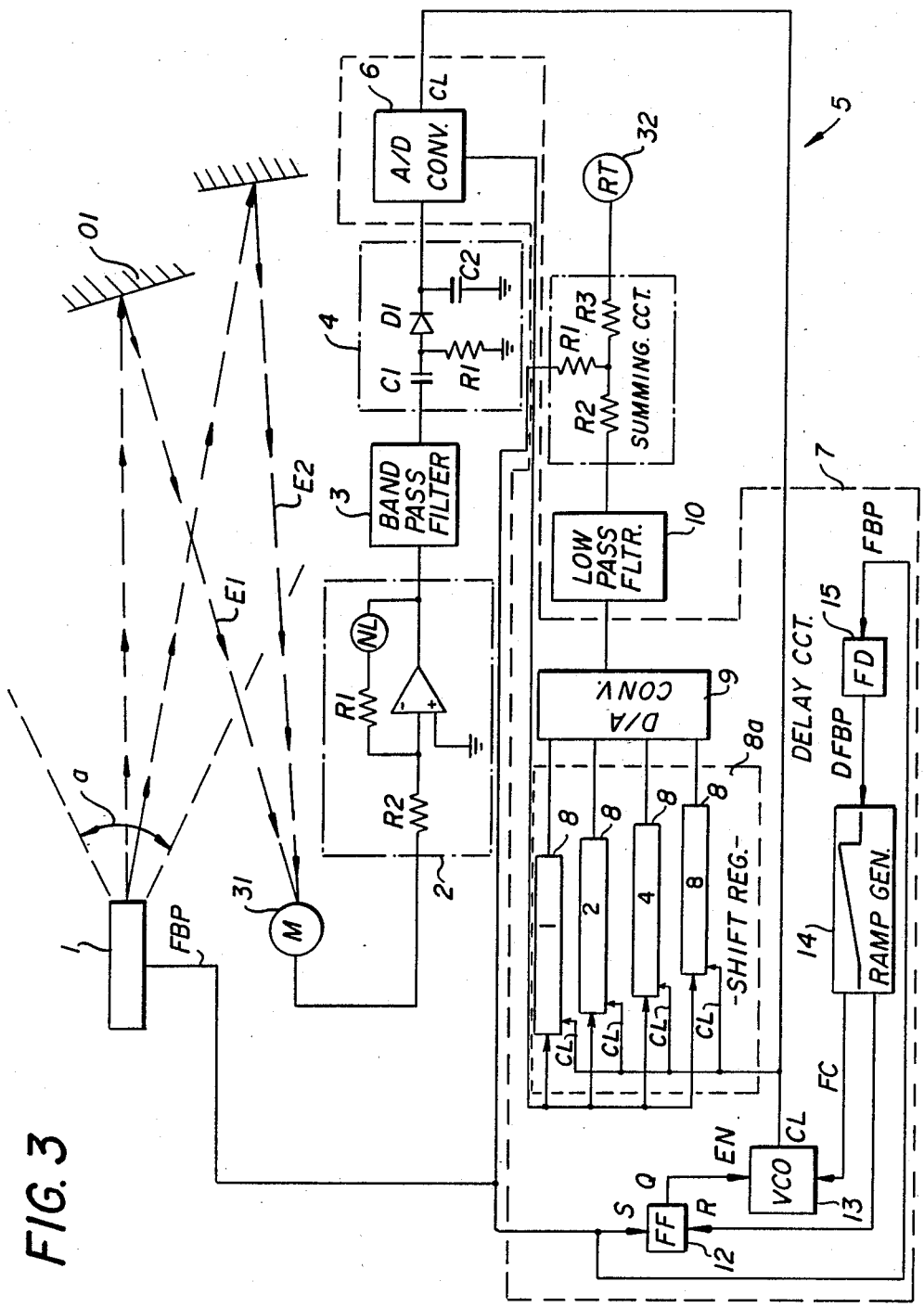
FIG. 3 is a circuit diagram of the delay circuit clocked with a frequency-modulated clock signal, based on the use of digital binary weighted shift registers.

FIG. 3 shows details of one receive channel 5. The microphone 31 receives the echoes E1, E2 and generates an echo signal for each sound burst, connected to the input of an amplifier stage 2, having feedback resistors R1, R2 for gain stability.

The sound emitter emits sound bursts that are advantageously in the ultrasound range beyond the audible range. The received echoes are therefore also inaudible. The feedback network R1, R2 may advantageously also include nonlinear components NL, e.g. diodes so that a logarithmic gain response is attained, which will tend to give lower gain for stronger echoes from nearby objects and conversely greater gain for more distant objects. The output of the amplifier stage 2 is connected to a bandpass filter 3, having a passband narrow enough around the selected burst frequency to reject unwanted room noise. The output of the bandpass filter 3 is connected to an echo profile detector 4 which restores the echo to an audible signal. The profile detector has a rectifier diode D1 connected to an input network having a capacitor C1 and a resistor R1 joined to the anode of diode D1 and respectively connected to the output of bandpass filter 2 and ground. A filter capacitor C2 is connected between the cathode of diode D1 and ground. The diode cathode generates the echo profile signal which is in the audible frequency rang. The echo profile signal is connected to a variable delay circuit 7, shown in a dashed line box. The first stage of the variable delay circuit 7 is an analog/ digital converter 6, which converts the analog echo signal profile into a sampled digital signal consisting of repetitive digital samples consisting of for example four bits each. The sampling frequency CL is of the Nyquist rate, in other words of a frequency at least twice the highest frequency component of the echo profile signal. The bits of the digital samples are each connected to a respective shift register 8. The shift registers 8 are parallel connected and have binary weightings 1,2,4, and 8. The shift registers have outputs connected to respective inputs of a digital/analog converter 9, which is followed by a lowpass filter 10. The lowpass filter produces a delayed analog output representing the original echo profile delayed a delay time VD, equal to the travel time through the shift registers 8, plus a fixed delay d. The travel time through the shift registers 8 is controlled by a variable shift clock CL, generated by a voltage-controlled oscillator VCO, having a frequency control input FC, connected to a ramp generator 14, which generates a ramp of a positive slope, shown in FIG. 5, line f. The feedback pulse FBP from the sound burst emitter 1, which signals the emission of a sound burst, is connected to a set input S of a flip-flop 12, having an output Q, connected to an enable input EN of the VCO 13. When input EN goes active, the VCO starts oscillating at its base frequency, which appears at the clock output CL. The feedback pulse FBP is also connected to a fixed delay circuit FD, 15, which emits a delayed feedback pulse DFBP which starts the ramp of the ramp generator 14, and which in turn generates a delayed ramp signal of increasing voltage at the frequency control input FC of the VCO 13. The fixed delay circuit 15 may advantageously be of the well-known type 555 timing circuit or a similar circuit. At the start of the ramp voltage the shift clock CL from the VCO starts to increase in frequency, which in turn starts a decrease in travel time through the shift registers 8. At the end of the ramp signal the ramp generator generates a reset pulse for the flip-flop 12, causing the VCO to stop oscillating as the enable signal EN goes back to zero. At that time the delay circuit 7 is ready to receive the next echo.

It follows that the delay of the echo signal will follow a function as shown in curve c in FIG. 1b, with an initial fixed delay d followed by an increasing delay having a diminishing rate of increase, due to the increase in frequency of the VCO. It follows that the ramp need not have a positive slope as shown but can have other shapes, e.g. a logarithmic shape or no slope at all, in which case the delay curve will be as shown in FIG. 1b, curve f.

A summing circuit 11 which is part of the receiving circuit 5 receives the feedback pulse FBP and merges it with the delayed echo profile signal. The output of the summing circuit 11 is connected to a receive transducer 32 which is coupled acoustically to an ear of the blind person. In operation the user hears first the feedback pulse followed by the delayed echo(es). The feedback pulse gives a reference for evaluating the distance to reflecting objects. Other forms of delay circuits may be used. For example a charge-coupled device (CCD) may be used as an analog shift register, combined with a VCO and a ramp generator as described above.

In operation the user hears first the feedback pulse followed by the delayed echos(es). The feedback pulse gives a reference for evaluating the distance to reflecting objects.

In a binaural arrangement having two delay circuits, it follows that the VCO and the ramp generator can be common to the two delay circuits. Such an arrangement in fact provides a better operation, in that the two echoes E1 and E2 are treated identically so that the minute differences in the two echoes E1 and E2 can be better discerned by the user.

Figure 4:
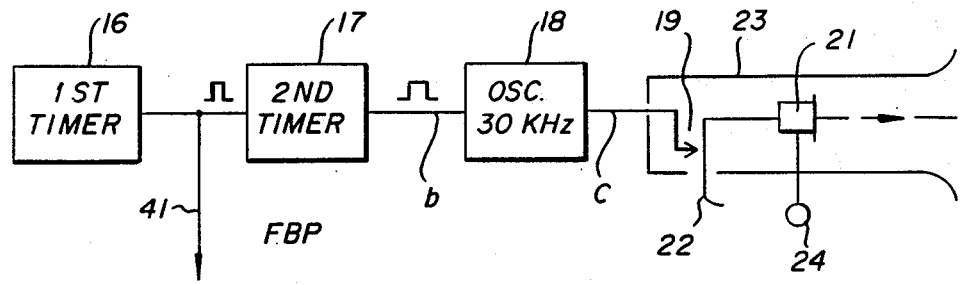
FIG. 4 is a block diagram of a sound burst emitter according to the instant invention.

FIG. 4 is a block diagram of the sound emitter 1. A first timer 16 generates a start pulse for each sound burst. The start pulse may be equivalent to the feedback pulse FBP. It also starts a second timer 17 which controls the duration of each sound burst by means of an enabling signal b connected to an oscillator 18, which in turn generates a signal of e.g. 30 kHz, which is connected to a transmit transducer 21 coupled to the air, thereby generating the sound bursts. The transmit transducer 21 is advantageously housed in a horn 23 which forms the sound bursts into a directed beam. The beam angle can be controlled by sliding the transmit transducer 21 axially in the horn 23 by means of a knob 24. A trigger 22 connected to a make contact 19 serves to manually control the emission of the sound bursts.

Figure 5:
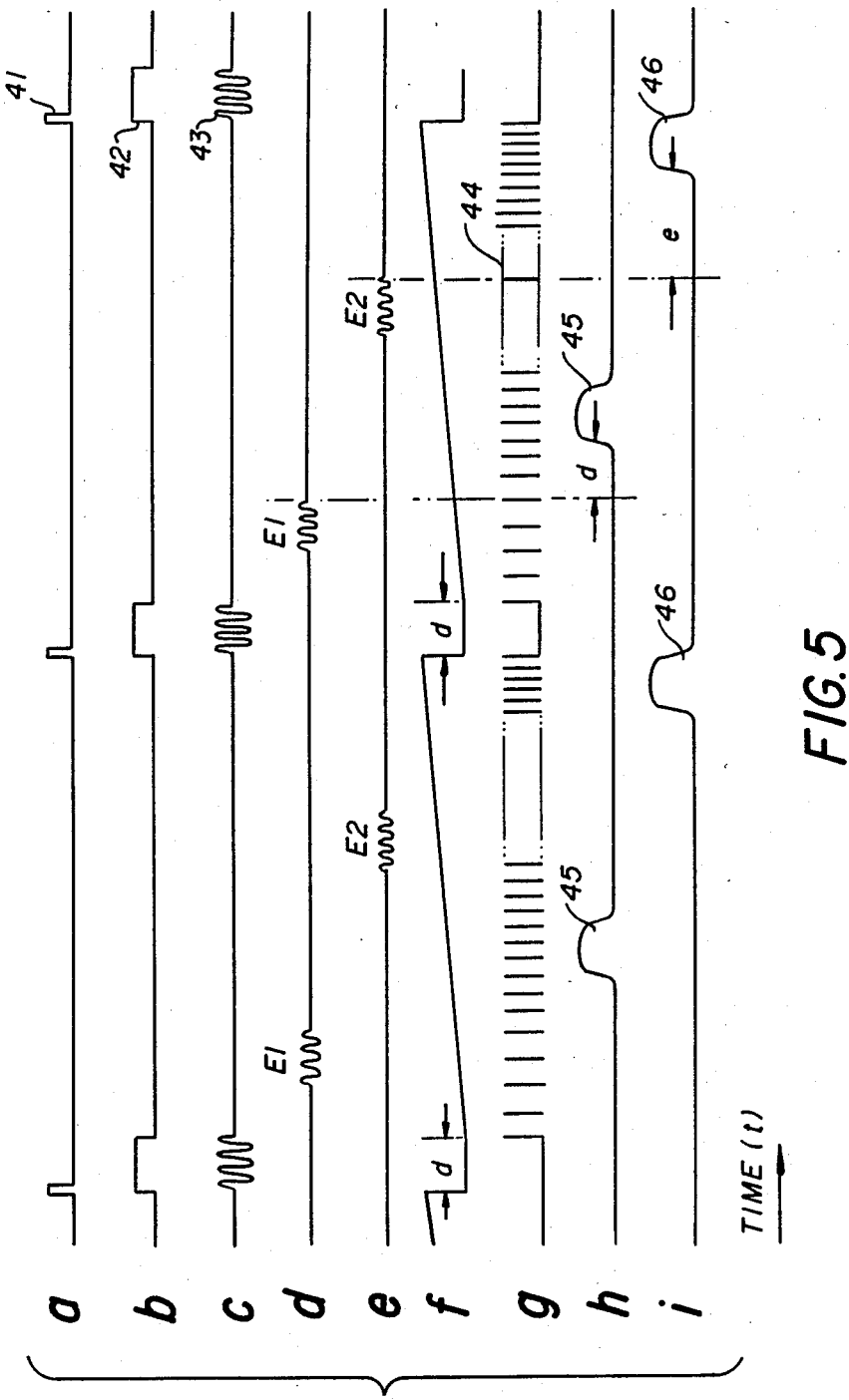
FIG. 5 shows a series of graphs of sound bursts, their echoes and their delayed echo signals as described in the following detailed description of the invention.

In FIG. 5 line "a" pulses 41 are start pulses for the sound bursts which are similar in timing to the feedback pulses FBP. Line "b" shows the enable pulses 42 for the frequency oscillator 18. Line "c" shows the sound bursts as short trains of supersonic sound waves. Lines "d" and "e" show echoes respectively from a nearby and a more distant object. Line "f" shows the ramp pulses with a linear positive slope, starting with a delay "d" from the start pulses 41. Line "g" shows trains of shift pulses 44 with increasing clock frequency from the beginning to the end of the train. Line "h" shows delayed echo signals 45 from the nearby object O1 delayed by the fixed delay d, and line j shows delayed echo signals from the more distant object O2 having the fixed delay d plus an amount of the variable delay.

Figure 6:
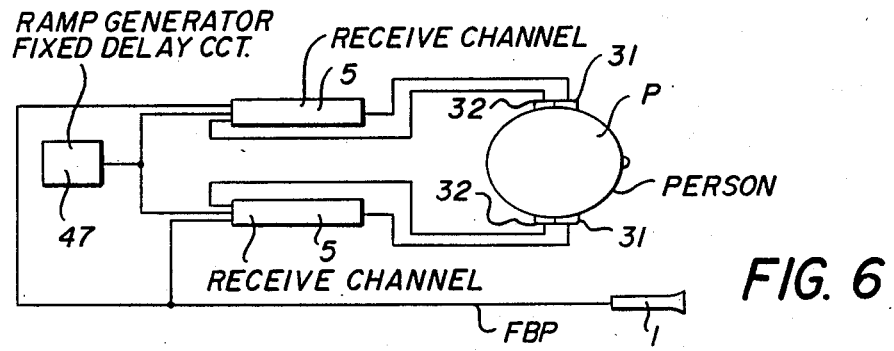
FIG. 6 shows a person provided with apparatus according to the invention.

FIG. 6 shows a user P provided with a microphone 31 close to each ear and a receive transducer 32 also close to each ear, and a receive channel 5 for each ear, in a binaural arrangement. The voltage controlled oscillator, the ramp generator and the fixed delay circuit are combined in a unit 47 commonly connected to the two receive channels 5. A handheld sound emitter 1 has a feedback pulse lead FBP connected to the two receive channels 5. It is contemplated that all circuitry be realized as micro circuit components so that all circuitry can be fitted into a single pocket or carried on a belt.

I claim:

1. Echo locating apparatus for a vision-impaired person, comprising: hand held means for emitting sound bursts of a given fixed frequency; echo receive means spaced apart from said sound burst emitting means including at least one receive channel, having a microphone for generating an echo signal for each sound burst received; an echo profile detector for generating an echo profile signal of each echo signal, connected to said microphone; time stretching means for time stretching the echo profile signal by a constant and a variable amount, connected to said echo profile detector; and a receiver-connected transducer connected to said stretching means, acoustically coupled to an ear of said person.

2. Apparatus according to claim 1, wherein said variable amount has a fixed rate of increase.

3. Apparatus according to claim 1, wherein said variable amount has a decreasing rate of increase.

4. Each locating apparatus according to claim 1 including means for generating an audible feedback pulse from said sound emitter for each sound burst, to said receive means.

5. Apparatus according to claim 1, wherein each of said sound bursts is a train of sound waves of supersonic frequency.

6. Apparatus according to claim 1, wherein said sound burst emitter includes means for emitting a beam of said sound bursts, and means for selectively varying the angle of said beam of sound bursts.

7. Apparatus according to 1, including an amplifier stage having a logarithmic gain function, for amplifying said echo signal.

8. Apparatus according to claim 1, including a bandpass filter for passing the frequency of said sound burst.

9. Apparatus according to claim 1, wherein said sound burst emitter includes a first timer for generating a start pulse for said sound burst, a second timer being responsive to said first timer for timing the duration of said sound burst, a frequency generator for generating the frequency of said sound burst, being responsive to said second timer, and a transmit transducer connected to said frequency generator for generating sound waves for said sound burst.

10. Apparatus according to claim 9 wherein said sound burst emitter includes a horn for directing said sound bursts as a beam of directed sound bursts.

11. Apparatus according to claim 1 including a trigger connected to said sound burst emitter for manually controlling the emission of said sound bursts.

12. Apparatus according to claim 1, wherein said delay means include a clock-driven charge-coupled shift register having a shift clock input connected to a voltage-controlled oscillator.

13. Echo locating apparatus for a vision-impaired person comprising: means for emitting sound bursts of a given frequency; echo receive means including at least one receive channel, having a microphone for generating an echo signal for each sound burst received, an echo profile detector for generating an echo profile signal of each echo signal, connected to said microphone, time stretching means for time stretching the echo profile signal by a constant and a variable amount, connected to said echo profile detector; a receiver-connected transducer connected to said stretching delay means acoustically coupled to an ear of said person; wherein said variable amount has a decreasing rate of increase.

14. Apparatus according to claim 13, wherein said time stretching means include a plurality of parallel-connected shift registers having a shift clock input, a digital input and a digital output, an analog to digital converter for converting said echo profile signal to a digital signal, connected to said digital input; a digital to analog converter connected to said output; a voltage-controlled oscillator having a frequency control input for generating a variable shift frequency connected to said shift clock input; a ramp generator having a ramp output connected to said frequency control input; and a fixed delay circuit for delaying start of the ramp generator.

15. Apparatus according to claim 14, including a bandpass filter connected to the output of said digital to analog converter for generating a delayed echo profile signal.

16. Echo locating apparatus according to claim 13 including two of said receive channels, each channel coupled to a respective ear of said person for providing binaural reception of said echoes.

17. Apparatus according to claim 16, wherein said delay means include a plurality of parallel-connected shift registers having a shift clock input, a digital input and a digital output, an analog to digital converter for converting said echo profile signal to a digital signal, connected to said digital input: a digital to analog converter connected to said output: a voltage-controlled oscillator having a frequency control input for generating a variable shift frequency connected to said shift clock input; a ramp generator having a ramp output connected to said frequency control input: and a fixed delay circuit for delaying start of the ramp generator, wherein said voltage-controlled oscillator, said ramp generator and said fixed delay circuit are common to said two receive channels.

* * * * *